(12) United States Patent
Huang

(10) Patent No.: US 9,566,698 B2
(45) Date of Patent: Feb. 14, 2017

(54) HOLDING TOOL FOR FIXING BEARINGS

(71) Applicant: POUL CHANG METAL INDUSTRY CO., LTD., Taichung (TW)

(72) Inventor: Chia-Hao Huang, Taichung (TW)

(73) Assignee: POUL CHANG METAL INDUSTRY CO., LTD., Taichung (TW)

( * ) Notice: Subject to any disclaimer, the term of this patent is extended or adjusted under 35 U.S.C. 154(b) by 9 days.

(21) Appl. No.: 14/597,619

(22) Filed: Jan. 15, 2015

(65) Prior Publication Data

US 2016/0207184 A1 Jul. 21, 2016

(51) Int. Cl.
| | |
|---|---|
| *B25B 27/14* | (2006.01) |
| *B25B 27/06* | (2006.01) |
| *B23P 15/00* | (2006.01) |
| *B23P 21/00* | (2006.01) |
| *B23P 19/04* | (2006.01) |
| *B23P 11/02* | (2006.01) |
| *B23P 19/10* | (2006.01) |
| *B23P 19/02* | (2006.01) |
| *B25B 13/50* | (2006.01) |

(52) U.S. Cl.
CPC .............. *B25B 27/06* (2013.01); *B23P 11/027* (2013.01); *B23P 15/003* (2013.01); *B23P 19/02* (2013.01); *B23P 19/04* (2013.01); *B23P 19/10* (2013.01); *B23P 21/002* (2013.01); *B25B 13/5083* (2013.01)

(58) Field of Classification Search
USPC ......................................................... 29/275
See application file for complete search history.

(56) References Cited

U.S. PATENT DOCUMENTS

| | | | | |
|---|---|---|---|---|
| 3,956,801 | A * | 5/1976 | Wood ..................... | F16C 35/067 29/275 |
| 4,339,865 | A * | 7/1982 | Shultz ..................... | B25B 27/06 29/255 |
| 4,429,447 | A * | 2/1984 | Davis ..................... | B25B 27/06 29/262 |
| 5,528,809 | A * | 6/1996 | Green ..................... | B25B 27/06 29/275 |
| 6,088,898 | A * | 7/2000 | Lundsten ................ | B25B 27/06 29/255 |
| 6,442,817 | B1 * | 9/2002 | Swanson ................. | B25B 27/06 29/275 |
| 6,916,026 | B2 * | 7/2005 | Meza ..................... | B23B 31/16 157/16 |
| 7,226,055 | B1 * | 6/2007 | Bettencourt ...... | H01L 21/68728 118/503 |

(Continued)

*Primary Examiner* — Alvin Grant

(57) ABSTRACT

A holding tool for fixing bearings contains: a fixer, a rotary bar, and a plurality of positioning paws. The fixer includes a threaded hole and plural slots, one end of an inner wall of each slot communicates with the threaded hole, and each positioning paw is mounted on each slot. The fixer also includes a plurality of springs, each being fixed on each slot and each positioning paw has a stepped abutting rib and a tilted guiding face. The rotary bar includes a screwing section for screwing with the threaded hole, and the rotary bar also includes a conical contacting segment formed on a first end thereof and inserting through the threaded hole, wherein the contacting segment abuts against the tilted guiding face, after the rotary bar is screwed, such that each positioning paw is pushed by the contacting segment to expand outwardly.

5 Claims, 7 Drawing Sheets

(56) References Cited

U.S. PATENT DOCUMENTS

| | | | | |
|---|---|---|---|---|
| 7,644,481 B2* | 1/2010 | Kang | ............... | B25B 27/06 |
| | | | | 29/255 |
| 7,707,709 B2* | 5/2010 | Whitehead | ............ | B25B 27/06 |
| | | | | 29/255 |
| 2003/0222415 A1* | 12/2003 | Mandokoro | ............ | B23B 31/16 |
| | | | | 279/118 |
| 2014/0196266 A1* | 7/2014 | Hung | ............... | B25B 27/06 |
| | | | | 29/275 |
| 2014/0208558 A1* | 7/2014 | Gass | ............... | B25B 27/02 |
| | | | | 29/283 |
| 2015/0190912 A1* | 7/2015 | Liu | ............... | B25B 27/06 |
| | | | | 29/275 |

* cited by examiner

HOLDING TOOL FOR FIXING BEARINGS

FIELD OF THE INVENTION

The present invention relates to a holding tool for fixing bearings which adjusts its diameter to correspond to the bearings of different sizes, such that one of the bearings is hit so that a pushing force spreads to the bearing evenly, thus fixing the bearing stably and easily.

BACKGROUND OF THE INVENTION

A conventional bearing is hit to push the bearing into a machine or a workpiece, but such a fixing manner exerts a hitting force on the bearing unevenly.

TW Patent No. 1294813 disclosed a conventional holding tool for fixing bearings containing a rotary bar, and the rotary bar includes a connecting shaft extending outwardly from one end thereof, wherein the connecting shaft has a coupling orifice defined thereon. The conventional holding tool also contains at least one pressing block of various diameters which is fitted with the rotary bar, wherein each pressing block has a through hole defined on a central position thereof, a first contacting portion, a first forcing rim, a second contacting portion, and a second forcing rim. The conventional holding tool further contains a connector for connecting with the rotary bar. Thereby, the first contacting portion, the first forcing rim, the second contacting portion, and the second forcing rim of each pressing block abut against an inner wall and a top end of the bearing to balance a hitting force on the bearing, such that the bearing is fixed in the coupling orifice of the connecting shaft. Moreover, the at least one pressing block has different diameters to match with bearings of various sizes.

Nevertheless, a specific diameter of each pressing block cooperates with a bearing of a same diameter as that of each pressing block, thus fixing the bearings of various sizes troublesomely as applying the at least one pressing block of different diameters.

The present invention has arisen to mitigate and/or obviate the afore-described disadvantages.

SUMMARY OF THE INVENTION

The primary objective of the present invention is to provide a holding tool for fixing bearings which adjusts its diameter to correspond to the bearings of different sizes, such that one of the bearings is hit so that a pushing force spreads to the bearing evenly, thus fixing the bearing stably and easily.

To obtain the above objective, a holding tool for fixing bearings provided by the present invention contains: a fixer, a rotary bar, and a plurality of positioning paws.

The fixer includes a threaded hole defined on a central position thereof to insert the rotary bar, and the fixer also includes plural slots radially arranged on a front surface thereof at an equal distance, wherein one end of an inner wall of each slot communicates with the threaded hole, and each of the plurality of positioning paws is mounted on each slot.

The fixer also includes a plurality of springs, each spring being fixed on each slot, such that the plurality of springs push the plurality of positioning paws to move toward the central position of the fixer, each positioning paw has a stepped abutting rib formed around an arcuately outer side thereof, and each positioning paw also has a tilted guiding face defined on an inner wall of a bottom end thereof.

The rotary bar includes a screwing section for screwing with the threaded hole, and the rotary bar also includes a conical contacting segment formed on a first end thereof and inserting through the threaded hole, wherein the contacting segment abuts against the tilted guiding face, after the rotary bar is screwed, such that each positioning paw is pushed by the contacting segment to expand outwardly.

Preferably, the plural stepped abutting ribs of the plurality of positioning paws are in various sizes.

Preferably, each slot has an inner recess defined on a bottom end thereof to accommodate each spring and has two limiting extensions arranged on two sides of a top end thereof; each positioning paw has a retainer mounted in each slot, and the retainer has a column formed on one end thereof and inserted into the inner recess, two ends of each spring abut against the inner recess and the column, and the retainer also has two cutouts defined on two sides thereof to retain with the two limiting extensions.

Preferably, the rotary bar further includes a threaded sleeve for screwing with the screwing section and corresponding to a back surface of the fixer.

Preferably, the rotary bar further includes a removable impact block fixed on a second end thereof opposite to the conical contacting segment.

Thereby, the holding tool for fixing the bearings comprises the plurality of positioning paws which are connected together to produce the push face for pushing the bearings, hence the bearings are forced evenly. After hitting the rotary bar, the bearings are pushed into a machine or workpiece, and the rotary bar is rotated to move the plurality of positioning paws, thus adjusting the push face at a desired size easily and quickly.

DETAILED DESCRIPTION OF THE PREFERRED EMBODIMENTS

Figure 1:
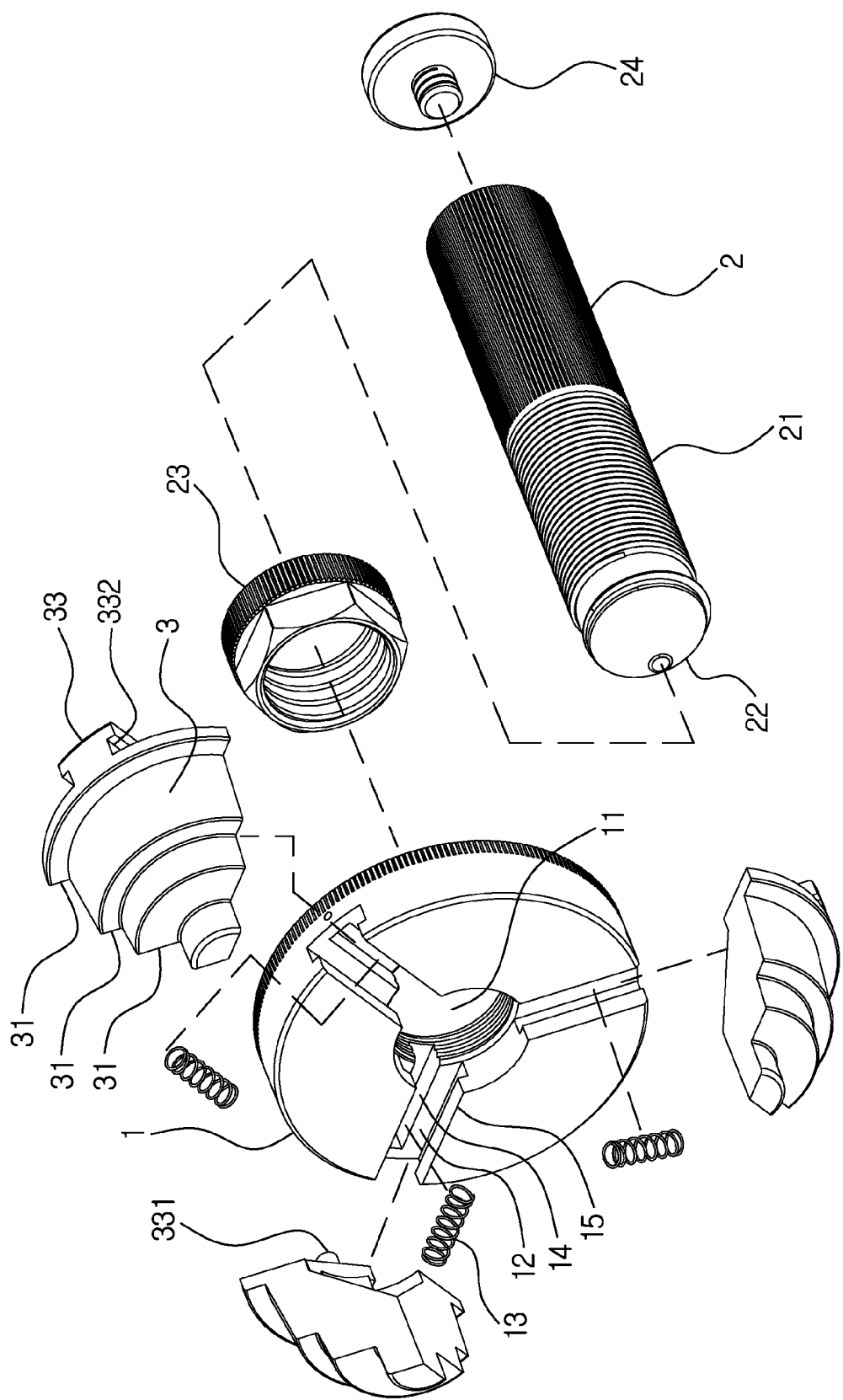
FIG. 1 is a perspective view showing the exploded components of a holding tool for fixing bearings according to a preferred embodiment of the present invention.
Figure 2:
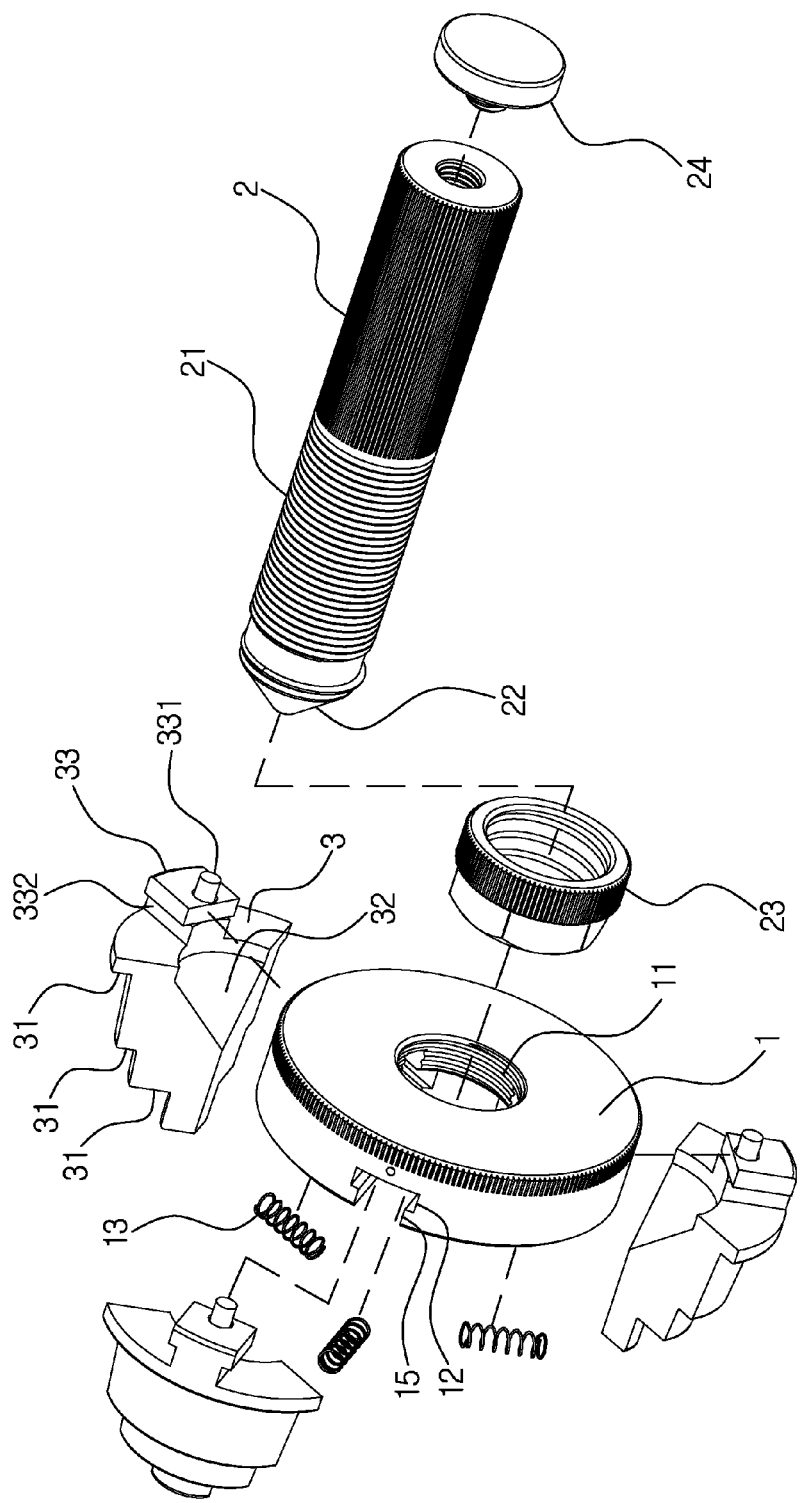
FIG. 2 is another perspective view showing the exploded components of the holding tool for fixing the bearings according to the preferred embodiment of the present invention.

A holding tool for fixing bearings according to a preferred embodiment of the present invention allows its diameter to correspond to the bearings of different sizes, such that one of the bearings is hit so that a pushing force spreads to the bearing evenly, thus fixing the bearing stably and easily. With reference to FIGS. 1 to 7, the holding tool for fixing the bearings comprises: a fixer 1, a rotary bar 2, and a plurality of positioning paws 3. In this embodiment, three positioning paws 3 are configured, but a number of the plurality of positioning paws 3 is adjustable based on using requirements.

The fixer 1 includes a threaded hole 11 defined on a central position thereof to insert the rotary bar 2 and includes plural slots 12 radially arranged on a front surface thereof at an equal distance, wherein one end of an inner wall of each slot 12 communicates with the threaded hole 11, and each of the plurality of positioning paws 3 is mounted on each slot 12. The fixer 1 also includes a plurality of springs 13, each spring 13 being fixed on each slot 13, such that the plurality of springs 13 push the plurality of positioning paws 3 to move toward the central position of the fixer 1, and each positioning paw 3 has a stepped abutting rib 31 formed around an arcuately outer side thereof (as shown in FIGS. 3 and 4, each positioning paw 3 retracts inwardly, and its stepped abutting rib 31 corresponds to one of the bearings of a smallest size), and each positioning paw 3 has a tilted guiding face 32 defined on an inner wall of a bottom end thereof.

The rotary bar 2 includes a screwing section 21 for screwing with the threaded hole 11 and includes a conical contacting segment 22 formed on a first end thereof and inserting through the threaded hole 11, wherein the contacting segment 22 abuts against the tilted guiding face 32, after the rotary bar 2 is screwed, such that each positioning paw 3 is pushed by the contacting segment 22 to expand outwardly.

Figure 3:
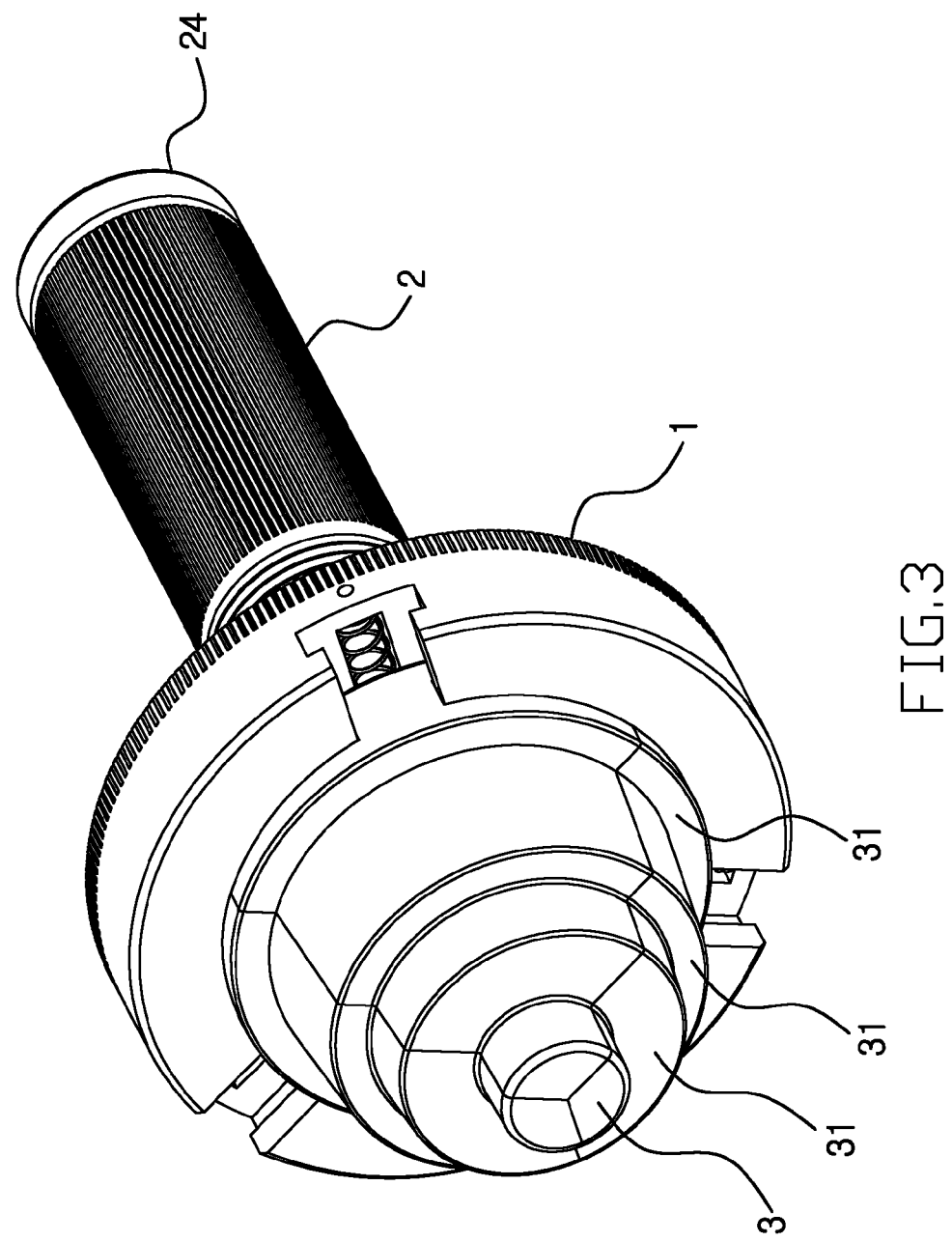
FIG. 3 is a perspective view showing the assembly of the holding tool for fixing the bearings according to the preferred embodiment of the present invention.
Figure 4:
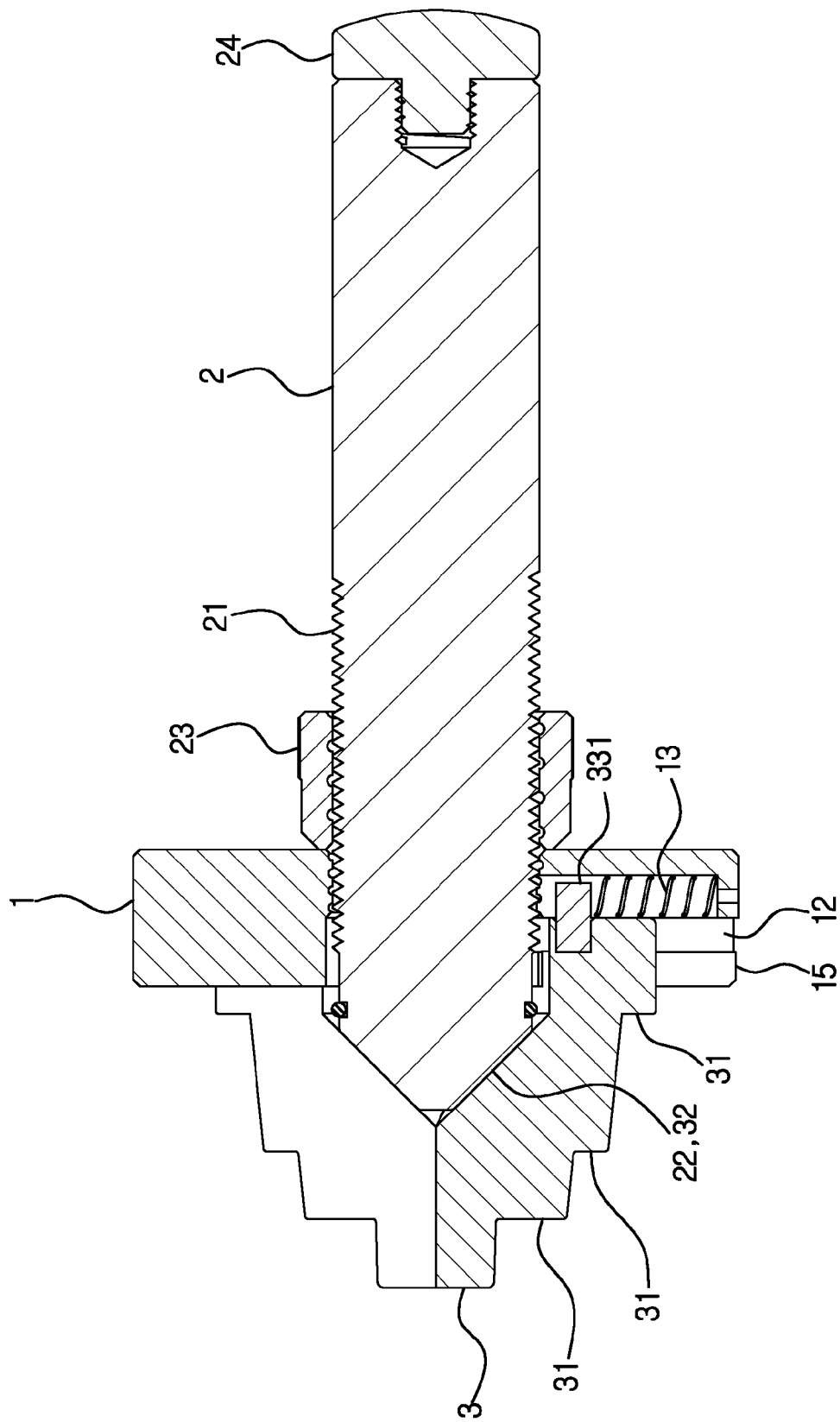
FIG. 4 is a cross sectional view showing the assembly of the holding tool for fixing the bearings according to the preferred embodiment of the present invention.
Figure 5:
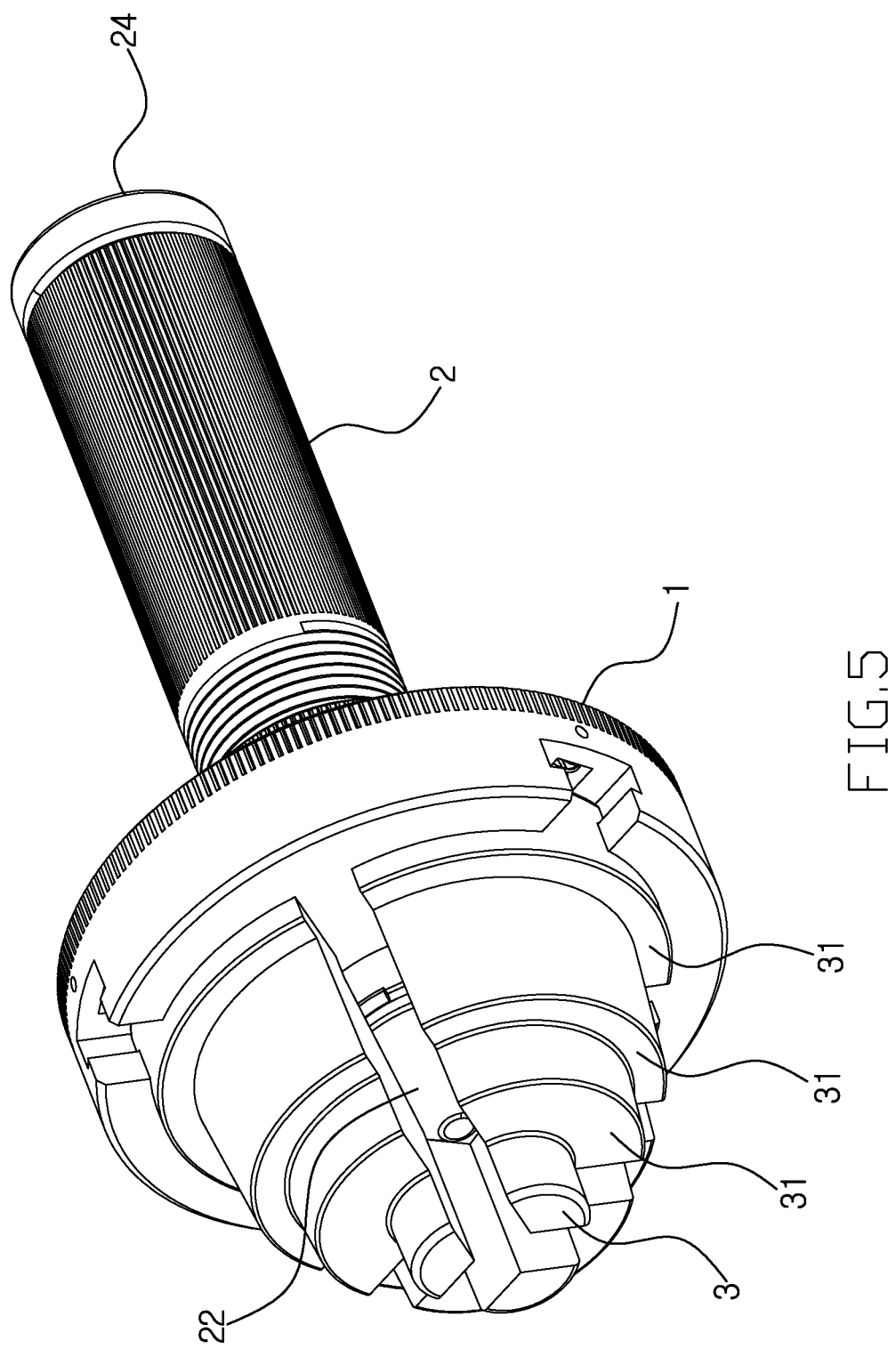
FIG. 5 is a perspective view showing the operation of the holding tool for fixing the bearings according to the preferred embodiment of the present invention.
Figure 6:
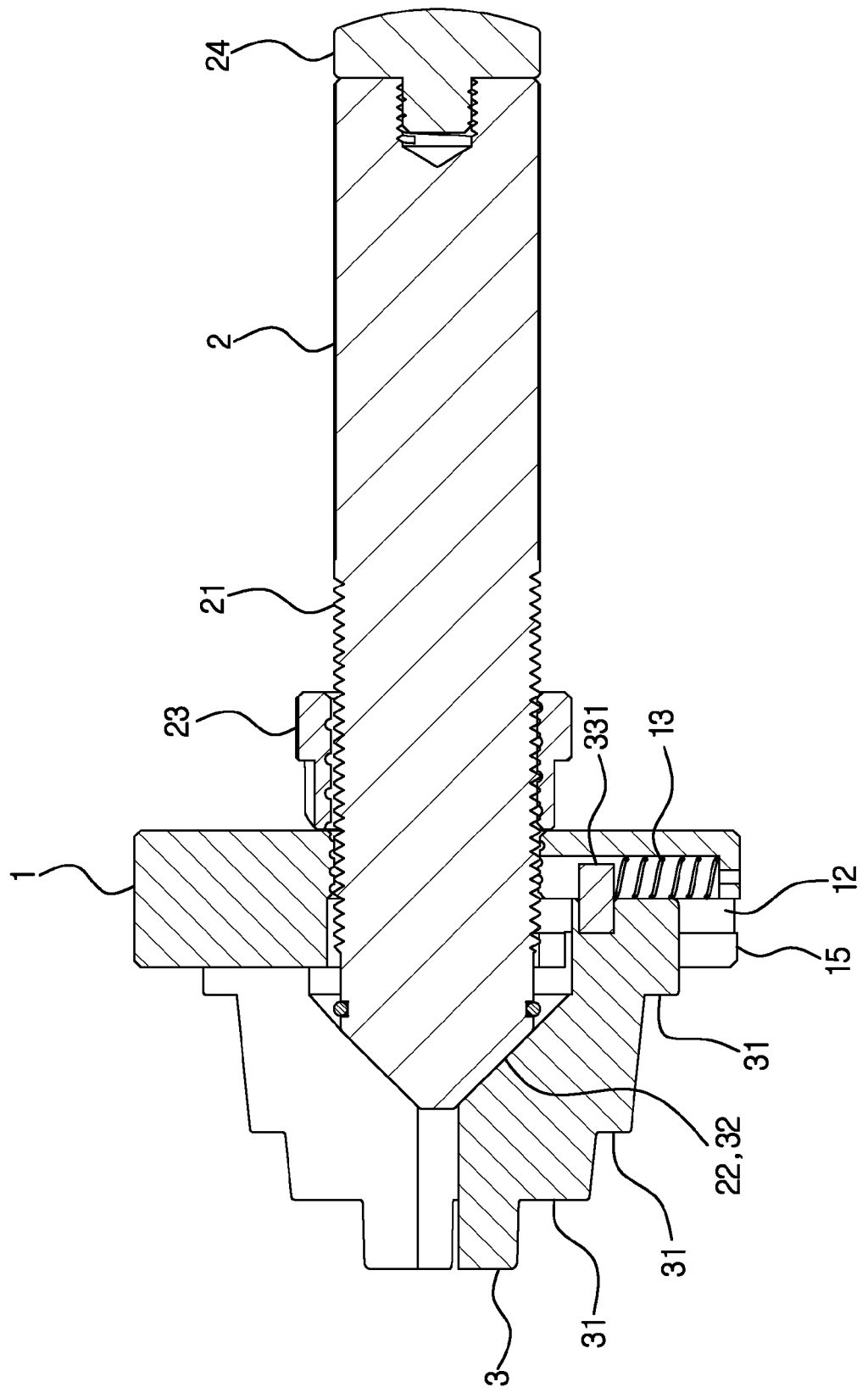
FIG. 6 is a cross sectional view showing the operation of the holding tool for fixing the bearings according to the preferred embodiment of the present invention.
Figure 7:
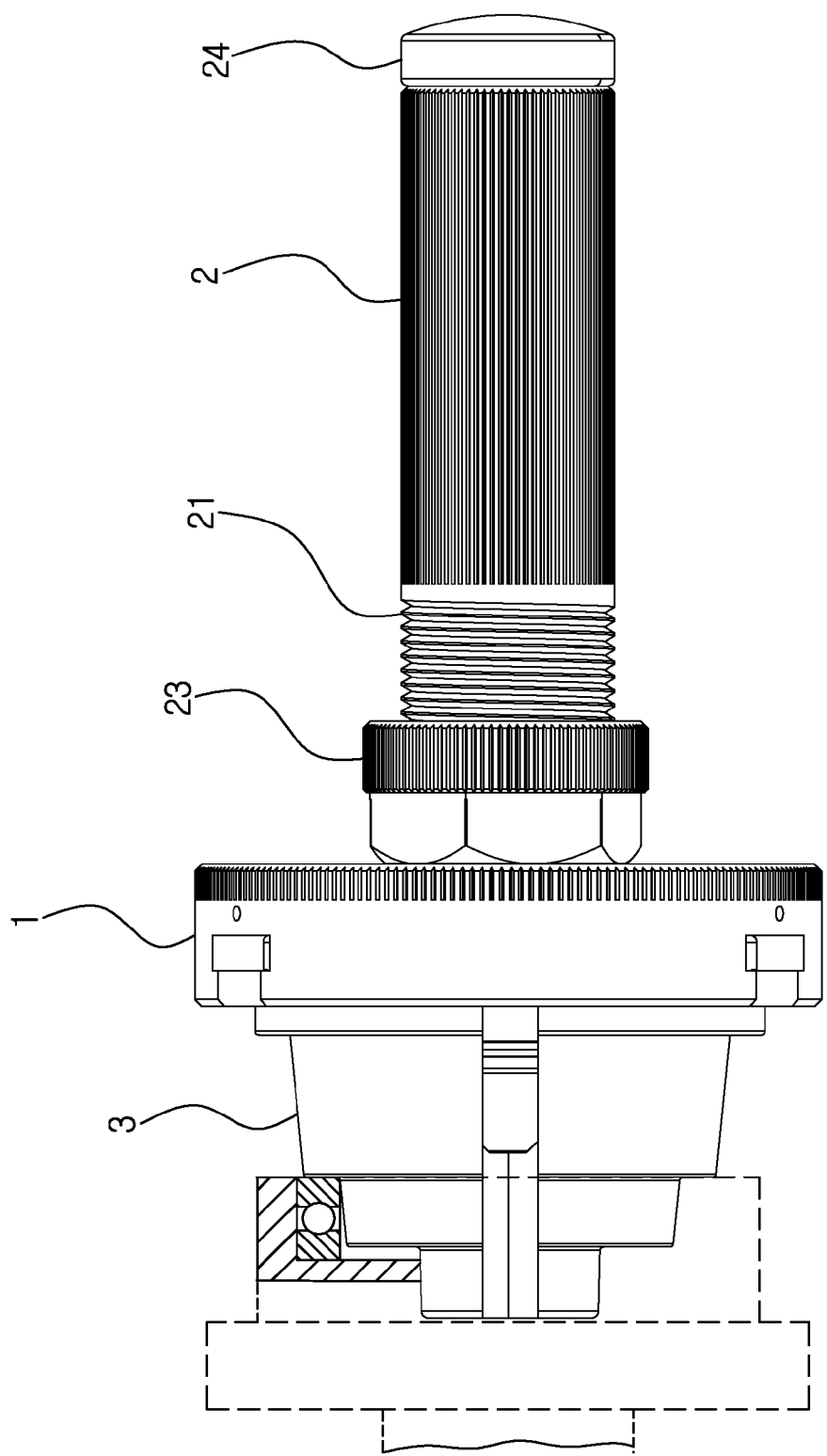
FIG. 7 is a schematic diagram view showing the application of the holding tool for fixing the bearings according to the preferred embodiment of the present invention.

Thereby, when the rotary bar 2 is unscrewed, its contacting segment 22 does not abut against the tilted guiding face 32, such that each positioning paw 3 is biased against by each spring 13 to retract inwardly (as illustrated in FIGS. 3 and 4), by which plural stepped abutting ribs 31 of the plurality of positioning paws 3 connect together to produce a push face of a smallest size to push the bearing. As screwing the rotary bar 2, its conical contacting segment 22 forces the tilted guiding face 32 to push the positioning paws 3 outwardly, thus expanding the plurality of positioning paws 3 relative to the fixer 1 and adjusting a size of the push face applicable for the bearing of a larger size (as shown in FIGS. 5 and 6).

Accordingly, the plural stepped abutting ribs 31 of the plurality of positioning paws 3 are in various sizes to adjust the push face of different sizes.

Preferably, each slot 12 has an inner recess 14 defined on a bottom end thereof to accommodate each spring 13 and has two limiting extensions 15 arranged on two sides of a top end thereof; each positioning paw 3 has a retainer 33 mounted in each slot 12, and the retainer 33 has a column 331 formed on one end thereof and inserted into the inner recess 14, two ends of each spring 13 abut against the inner recess 14 and the column 331, and the retainer 33 also has two cutouts 332 defined on two sides thereof to retain with the two limiting extensions 15.

The rotary bar 2 further includes a threaded sleeve 23 for screwing with the screwing section 21 and corresponding to a back surface of the fixer 1, such that the rotary bar 2 adjusts a position of the plurality of positioning paws 3, the threaded sleeve 23 is forced on the back surface of the fixer 1, thus avoiding an improper rotation between the fixer 1 and the rotary bar 2.

Preferably, the rotary bar 2 further includes a removable impact block 24 fixed on a second end thereof opposite to the conical contacting segment 22, such that the impact block 24 is hit by a hammer. In addition, the impact block 24 is replaceable after being damaged.

Thereby, the holding tool for fixing the bearings comprises the plurality of positioning paws 3 which are connected together to produce the push face for pushing the bearings, hence the bearings are forced evenly. After hitting the rotary bar 2, the bearings are pushed into a machine or workpiece, and the rotary bar 2 is rotated to move the plurality of positioning paws 3, thus adjusting the push face at a desired size easily and quickly.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A holding tool for fixing bearings comprising:
   a fixer,
   a rotary bar, and
   a plurality of positioning paws;
   wherein:
   the fixer includes a threaded hole defined on a central position thereof for insertion of the rotary bar, the fixer also including a plurality of slots radially arranged and equally spaced on the front surface thereof, wherein one end of an inner wall of each slot communicates with the threaded hole, and each of the plurality of positioning paws is respectively mounted on each slot;
   the fixer also includes a plurality of springs, each spring being respectively fixed on each slot, such that the plurality of springs push the plurality of positioning paws to move toward the central position of the fixer, each positioning paw having a stepped abutting rib formed around an arcuate outer side thereof, and each positioning paw also having a tilted guiding face defined on an inner wall of a bottom end thereof; and
   the rotary bar includes a threaded section for threadedly engaging with the threaded hole, the rotary bar also including a conical contacting segment formed on a first end thereof and insertable through the threaded hole, wherein the contacting segment abuts against the tilted guiding face, and in response to the rotary bar threadedly engaging with the threaded hole, each positioning paw is pushed by the contacting segment to expand outwardly.

2. The holding tool as claimed in claim 1, wherein the plurality of stepped abutting ribs of the plurality of positioning paws are of various sizes.

3. The holding tool as claimed in claim 1, wherein each slot has an inner recess defined on a bottom end thereof to accommodate each spring and has two limiting extensions arranged on two sides of a top end thereof; and
   each positioning paw has a retainer mounted in each respective slot, the retainer having a column formed on one end thereof and inserted into the inner recess, two ends of each spring abutting against the inner recess and the column, and the retainer also has two cutouts defined on two sides thereof to respectively engage with the two limiting extensions.

4. The holding tool as claimed in claim 1, wherein the rotary bar further includes a threaded sleeve for threadedly engaging with the threaded section and corresponding to a back surface of the fixer.

5. The holding tool as claimed in claim 1, wherein the rotary bar further includes a removable impact block fixed on a second end thereof, the second end opposite the first end.

\* \* \* \* \*